United States Patent Office 3,806,412
Patented Apr. 23, 1974

3,806,412
PROCESS OF ENZYMATICALLY DEPILATING
ANIMAL HIDES
Pierre Gagne, Caluire, and Jean Neel, Lyon, France, assignors to Rhone-Progil, Paris, France
Filed Dec. 19, 1972, Ser. No. 316,481
Claims priority, application France, Dec. 24, 1971, 047873
Int. Cl. C12b 1/00
U.S. Cl. 195—6
14 Claims

ABSTRACT OF THE DISCLOSURE

A process for removing hair or fur from animal hides utilizing enzymes which are immobilized on an insoluble carrier in the form of a powder or gel. Immobilization of the enzyme limits the proteolytic activity to surface proteins which bond the hair to the epidermis.

BACKGROUND OF THE INVENTION

The present invention relates to a process for enzymatically removing hair from animal hides and, more specifically, to a process for effectuating the removal of hair from hide utilizing proteolytic enzymes which are immobilized on an insoluble carrier.

A number of processes for depilating animal hides are known in the prior art. The most widely used method generally consists of treating hides by means of alkaline reducing baths or pastes which are normally comprised of lime and sodium sulfide in combination. The foregoing chemical agents do not cause the hair to be removed by destroying the bonds between the hair and the skin, but instead the removal of the hair is accomplished by simple chemical dissolution of the hair protein in the treatment bath which bath must be renewed after each operation. As a consequence of the frequent replenishing of the treatment bath required by the foregoing process, it represents an extremely time-consuming and expensive method of depilating animal hides. Moreover, the water discharged from the treatment bath contains large amounts of sulfide and organic products and is characterized by a relatively high chemical oxygen demand (COD) and biological oxygen demand (BOD). In the past, this waste water was allowed to drain into rivers and streams significantly contributing to the pollution thereof. While the chemical oxygen demand and the biological oxygen demand of the waste generated by the aforementioned process could be reduced by the use of suitable pollution abatement equipment, it is apparent that the installation and operational expenses of such measures are extremely high and represent an onerous solution to a problem which arises solely as a consequence of the extensive use of the above-described inefficient chemical process.

The use of enzymes in the treatment of animal hides to remove hair from, has heretofore been proposed as a means of overcoming the difficulties encountered with the previously described chemical process. However, as presently employed, these enzymatic processess cause substantial damage to the epithelial outer layer of the skin as well as to the inner derma resulting in leathers of extremely poor quality. The foregoing undesirable result is a consequence of the nonspecificity of the enzymes utilized in these processes which reacts with proteins of the inner layers of skin as well as the epidermis so that the leather obtained by subsequent tanning treatment has a damaged grain side characterized by visible veins and other flaccid portions of deeper tissue. In fact, the damage to bovine skins treated by such prior art enzyme processes is so extensive that the removal of hair from animal hides in this manner is completely unsatisfactory from a commercial standpoint.

Therefore, there exists a need for a process whereby hair may be removal from animal hides in the preparation of leather without destruction to the underlying tissues or necessitating the frequent addition of fresh treatment materials and the discharge of pollutants.

SUMMARY OF THE INVENTION

It is, therefore, a primary object of this invention to provide an enzymatic method of treating animal hides to remove hair therefrom without encountering the difficulties associated with prior art processes.

Another object of this invention, is to provide a process for depilating animal hides wherein an immobilized enzyme is employed which exerts its degradative effect only at the surface of the epidermis in contradistinction to heretofore known enzyme processes wherein the enzyme manifested a non-specific activity toward not only surface proteins but inner tissue as well thereby substantially damaging the hide.

Still another object of the instant invention, is to provide an enzymatic process for removing hair from animal hides which is substantially non-polluting in comparison with prior art lime/sulfide bath processes and which process permits the recovery and recycling of immobilized enzyme and the filtration and collection of undamaged hair removed by the process.

Other objects features and advantages of this invention will become more apparent to those skilled in the art from the drawings and detailed description of the invention which follow.

DETAILED DESCRIPTION OF THE INVENTION

Figure 1:
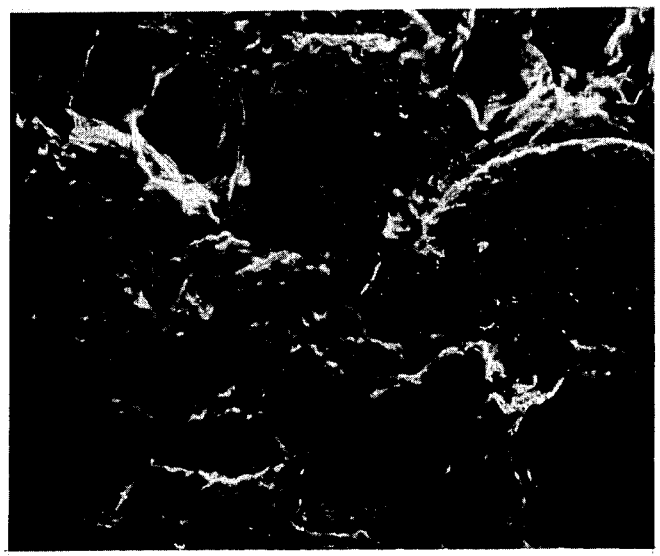
FIG. 1 is a photomicrograph of an animal hide treated according to the process of the present invention.

In accordance with this invention, it has now been found that the problems associated with the prior art enzymatic and chemical processes for depilating animal hides may be obviated by utilizing a process wherein the removal of hair from the hide is achieved by means of enzymes which are immobilized on an insoluble carrier in the form of a powder or gel in an aqueous environment whereby the attack of the enzyme is limited to surface protein and in particular to the epithelial layer of protein into which hair is embedded. As a consequence of the present process it is possible to obtain hides possessing the requisite qualities for a raw material intended for use in the production of commercially valuable leather.

In the following description, the words "in water" are implied whenever the term "insoluble carrier" is used.

Without limiting the present invention to any particular theory with respect to its mode of operation, it is believed that the role of the carrier consists of immobilizing the enzyme at the surface of the hide thereby preventing its penetration into the inner layers of the hide and destruction of the tissues disposed therein while at the same time maximizing the depilatory activity of the enzyme.

The use of an insoluble carrier material to immobilize an enzyme is known in the art and can be achieved by any one of the following four methods:

(1) Physical absorption onto inert carriers such as glass spheres, baked or unbaked clays, carbon, cellulose or ion-exchange resins;

(2) Covalent bonding between the enzyme and a suitable carrier;

(3) Incorporation of the enzyme within the network of a gel the pores of which are small enough to insure the retention of the enzyme in the network; and (4) Cross-linking the enzyme with a polyfunctional polymer.

The foregoing techniques have been the subject matter of numerous publications, especially in the fields of biochemical synthesis, synthesis of improved pharmaceuticals, and with respect to the treatment of foodstuffs, such as beer. In these instances, the objectives to be accomplished in immobilizing the enzyme on an insoluble carrier are twofold; increasing the thermal stability of the enzyme and replacement of a homogeneous catalyst by a heterogeneous one. Thus, a suitably chosen insoluble carrier enhances the thermal stability of the enzyme and facilitates the separation of the catalyst, raw materials and reaction products. The significance of the foregoing becomes apparent when one considers that the enzymatic clarification of beer was an impossibility until the introduction of the concept of immobilized enzymes which permitted the separation of the enzyme from the final product.

The properties of increased stability and ease of separation are indeed properties which might be useful in the enzymatic depilation of animal hides. However, until the present invention one essential characteristic of immobilized enzymes remained unrecognized in the art. As was previously explained the central drawback in the use of free enzymes to depilate animal hides was that they do not specifically catalyze the breakdown of the epidermal portion of the hide which binds the hair and are, therefore, equally damaging to the proteins of the inner dermal layers. On the other hand, it has now been realized that immobilized enzymes lack the capacity to penetrate into the inner layers due to the presence of the insoluble carrier and, accordingly, only proteins of the epidermis and especially those in the region of the hair follicles are destroyed by the chosen enzyme.

Any of the known enzymes evidencing depilatory activity can be immobilized on insoluble carriers according to the present invention. Without limiting the scope of the invention, these enzymes will generally be selected from the class of known hydrolases, and particularly valuable enzymes are the proteases which hydrolyze proteins. Moreover, any of the four immobilization methods referred to earlier can be used for the production of immobilized enzymes useful in the practice of the present invention.

In practicing the present invention, it is necessary that the enzyme and its carrier material be in such a form that the combination can easily be distributed on the surface of the skins to be treated. Consequently, the enzyme is usually immobilized on carriers which can be reduced to a powder or gel capable of settling in a film form on the surface of skins in water.

Typical methods of immobilizing the enzymes in accordance with the present invention will now be described.

Numerous organic or mineral carriers are capable of physically absorbing the enzymes and suitable carriers include natural polymers such as cellulose, synthetic polymers like acrylamide-polyacrylic acid copolymers, mineral and porous products such as porous glass spheres, quartz, carbon or clay particles. Although, immobilization by this method is easily achieved, it suffers from the disadvantage that the bond between the enzyme and the carrier is rather weak and the enzyme is, therefore, susceptible to desorption. It is known that this difficulty can be easily overcome by providing the support or carrier with reactive binding sites whereby it is possible to create a stronger bond between the enzyme and the carrier than is obtainable by physical absorption alone. The foregoing may be accomplished, for example, by reacting the carrier with a bifunctional reagent one active site of which attaches to the support, while the other active site attaches to the enzyme. In this manner, it is possible to obtain a strong covalent bond which greatly enhances the stability of the enzyme/carrier system.

In obtaining the aforementioned covalently bound enzyme systems, cyanuric, cyanogen, sulfuryl or thionyl halides are reactants which are particularly suitable for treatment of supports made of baked or unbaked clay. The clay carrier, for example, can be added as a suspension into a solution of the bi- or polyfunctional reactant, and after reaction, separated from the mixture and washed with a solvent of the bi- or poly-functional reactant and finally vacuum-dried. The relative proportions of clay and reactant may vary over a wide range, but, generally, a ratio by weight of reactant to clay between 0.05 and 10 is particularly suitable in the case where a cyanuric halide is employed and where the solvent is selected from the group consisting of chloroform, carbon tetrachloride, ketones and dioxane. Similarly, the enzyme can also be immobilized on a powder or gel of a water-insoluble polymer. In this method, the immobilization is probably achieved either by a covalent linkage with active sites of the polymer or by the inclusion of the enzyme in the interstices of the polymer. Various polymers are suitable for immobilizing enzymes and particularly advantageous polymers include methacrylic acid-acrylamide, ethylene-maleic anhydride and methacrylic acid-methacrylic acid 3-fluoro-4,6-dinitroaniline copolymers.

In effectuating the bond between the two, the enzyme and its carrier can be contacted before or during the treatment of the hides. The enzyme can be immobilized on its support at a stage preceding the actual hair removal process. Generally, the enzyme preparation is obtained by contacting the free enzyme and the modified or unmodified carrier in a dry state, the powder support or insoluble gel carrier being introduced into a solution subsequently buffered with the enzyme. The insoluble preparation thus obtained can be used per se, or it can undrgo further filtration and one or more washings intended to remove excess enzyme.

The relative ratio of the enzyme and its carrier will depend upon the nature of the carrier utilized and may vary over a wide range, particularly when immobilization is brought about by physical absorption or inclusion in a gel. However, where covalent linkages are utilized in the formation of the immobilized enzyme, the number of active sites linking the enzyme and the support will advantageously be approximately equal and consequently the ratio of the number of enzyme/carrier sites will be about 1. Where the immobilization of the enzyme on its carrier is followed by a washing, this ratio may be greater than 1 because the enzymes which are not strongly bound to the carrier will be removed. On the other hand, if the immobilization is carried out in situ during depilation, as described previously, the ratio will preferably be less than 1. As an illustration of typical amounts of enzyme and carrier present in the immobilized system of the present invention, a ratio by weight of enzyme/carrier between 0.1 and 0.5, preferably about 0.25 is generally used for an enzyme immobilized on a baked clay powder, which contains 800 p.p.m. of chlorine after treatment with sulfuryl chloride.

While practically any animal hide may be treated according to the process of the present invention, it has been observed that the best results are obtained on bovine hides.

In practice, the process of the present invention may be carried out in a number of different ways and under various conditions. Generally, the immobilized enzymes prepared as described previously are brought into contact with the animal hide to be treated in a suitable vessel, in which the percentage of water with respect to the hide is between 0.5% and 100% by weight and, preferably, 10% to 20%. The time required to complete the depilation process, the temperature and the pH of the suspension, as well as the relative amounts of hides and reactants are not critical factors. Although the foregoing aspects of the invention will vary according to the particular enzyme and carrier employed, it can be stated that the process takes between 3 to 24 hours, usually 5 to 7 hours, at a temperature between 0° C. and 50° C., preferably 20° C. to 40° C., and that the pH is usually maintained between 6 and 12, preferably 7.5 to 9. With respect to the quantity of enzyme required, 0.5 to 1.5 parts by weight of free enzyme per 100 parts by weight of hides generally constitutes a suitable range from the standpoint of maximum efficiency without increased costs.

The treatment vessel utilized in the instant process may be any tank or tumbler heretofore utilized in analogous processes. It may be advantageously equipped with a device for discontinuous agitation which will enhance the distribution of reactants on the surface of the hide. Agitation times of about 10 seconds every 15 minutes have been found to yield particularly satisfactory results. Following the depilatory action of the enzymes, it is usually necessary to mechanically extract the hair from the hide by any suitable means in order to effectuate the complete separation of the hair from the surface of the treated hide. The foregoing may be accomplished, for example, by the frictional engagement of the hides which naturally occurs during the agitation stage of the process, followed by a brief period of stronger agitation to complete the separation of hair and hide. Alternatively, the enzymatically treated hides may be passed through a conventional machine which permits the recovery of undamaged and unfelted hair.

According to a preferred embodiment of the invention, the immobilization of the enzyme on its carrier is accomplished during the actual depilation process. Accordingly, the free enzyme is placed in an aqueous solution in which the hide is dipped and after several minutes of agitation required to obtain a satisfactory distribution of the enzyme on the surface of the hide, the finely divided carrier is introduced into the treatment vessel. The formation of bonds between the enzyme and its carrier occurs much more rapidly than the destruction of surface proteins by the enzyme and, therefore, the introduction of the free enzyme prior to immobilizing same on the carrier does not adversely affect the hide. It is evident that the foregoing is a particularly advantageous method of carrying out the invention in that it is unnecessary to immobilize the enzyme prior to the initiation of the depilation process.

It will be apparent to those skilled in the art that the present invention may be preceded or followed by a number of operations customarily employed in the leather industry. For example, it is generally necessary to clean the hides prior to the depilation process and this may be accomplished utilizing water in a tumbler or a paddle wheel assembly whereby the salt solution utilized to preserve the hides may be removed. The washing operation may be followed by a sliming process utilizing aromatic or chlorinated solvents and detergents in aqueous solution. The sliming procedure permits the removal of many organic impurities such as greases, and mineral impurities which soil the hide and obstruct the hair follicles. Sliming is advantageously followed by another water washing to obtain a hide which is clean and free from impurities and cleaning products.

Subsequent to the foregoing preparatory treatments, the hide is subjected to a pre-tanning process which enhances the resistance of the derma to the action of enzymes. The extent of pre-tanning should be kept to a minimum in order to prevent the fixation of the hair to the hide, and mono- or dialdehydes, such as formaldehyde are particularly suitable.

After the depilation process, the hides are washed and drained. The wash waters contain undamaged hair and immobilized enzyme which can be separated by any known method such as settling or filtration.

Generally, the hides are introduced into a pit of pure lime following the hair removal process to hydrolyze them. The lime pit may be reused a number of times inasmuch as the hides treated according to the instant invention are extremely clean.

After treatment in the lime pit, it is noted that the grain side of the hide is not damaged and adheres quite well to the derma, while a hide depilated by means of free enzymes evidences a damaged grain side with a gelatinous hand and poor adherence to the derma which is also damaged.

The instant invention affords a process whereby the waste products resulting from the depilation process are considerably decreased in comparison to prior art enzyme or alkaline bath processes which were characterized by large quantities of discharged sulfides and dissolved hair in the wash waters. Moreover, the immobilized enzyme of the present invention can easily be recovered by filtration and it is no longer necessary to discharge same along with other polluting effluents.

Following the treatment of the hides according to the depilation process of the present invention, any conventional tannery process may be utilized, such as bating, pickling, chrome tanning, splitting and skewing, retaining nourishing, drying, staking and finishing.

The resulting leathers have a very fine grain which is superior in quality to that obtained by the lime/sulfide or free enzyme method, an absence of veins, and excellent adherence of the grain side to the derma even on pieces taken from the flanks of animals.

In order to further illustrate the present invention and the advantages thereof, the following specific examples are given, it being understood that same are intended merely as illustrative and in no wise limitative. For purposes of comparison, the following depilating processes are described in Example 1:

(1) The process according to the instant invention utilizing immobilized enzymes; and the prior art processes of (2) free enzyme depilation and (3) chemical hair removal in a bath containing lime and sodium sulfide.

EXAMPLE 1

Two right halves and two left halves were recovered from two split hides; the two right halves were then treated according to the instant invention, while one of the left halves was depilated in a lime-sodium sulfide bath, and the other treated with a solution of free enzymes.

Desalting of each of the four pieces was carried out by first washing same in a tumbler for 30 minutes in 300% by weight of water with respect to the hide pieces impregnated with salt. After emptying the bath, the pieces were dipped again in a tumbler with three times their weight of water and retained therein for 24 hours under discontinuout rotation. The two right halves of hides which were to be treated according to the present invention were slimed in a detergent mixture containing, in parts by weight with respect to the hide, 100% of water and 2% of Detagil ATR (registered trademark of Soprosoie) in a mixture of aromatic solvent and emulsifying agent. After rotating about 30 minutes, the liquids were removed from the tumbler and replaced by water (300% with respect to hide). After rotating an additional 15 minutes, the hides were rinsed with running water for about 15 minutes and then drained for 30 minutes.

The two right halves of hides were then depilated according to the process of the invention. A baked and finely ground (passed through a 200 mesh sieve) clay was prepared and reacted with 50 grams of sulfuryl chloride per kilogram of clay at 40° C. for 4 hours. The modified clay was washed and dried and by analysis was shown to contain 800 p.p.m. of chlorine. 5 parts by weight of the foregoing carrier were then mixed with 1 part by weight of enzyme (Rapidepilase-RTM-Rapidase a protease of *Bacillus subtilis*) and 25 parts by weight of water. The mixture was then agitated for 24 hour and allowed to settle. After the aqueous phase had been removed, the solid residue was washed twice with 25 parts of a solution containing 300 g./l. of sodium chloride and then vacuum-dried at 20° C. 1.5 kilograms of the residue thus prepared formed the immobilized enzyme preparation utilized in the depilating process. The enzyme/carrier preparation was introduced into a tumbler with the right halves of the hide to be treated weighing 25 kilograms and 2.5 liters of water were added. The depilation treatment was carried on for 5 hours with the tumbler rotating every quarter hour. The hide was then removed from the tumbler and passed through a machine for removing the separated hair.

One of the left halves of hide was treated in the foregoing manner with the exception that free enzyme (Rapidepilase No. 7 without carrier) was utilized as the depilating agent.

The second left half of hide was treated in a bath containing 10 g./l. of lime and 8.3 g./l. of sodium sulfide.

After undergoing depilation, each of the four halves of hides were dipped for 36 hours in a lime pit containing three times the weight of hides of a saturated solution of lime containing 10 g./l. of lime. They were then fleshed, cleaned and rinsed before undergoing conventional tanning processes for the production of a chrome leather.

The results obtained are shown in Table 1 hereinafter.

about 30° C. After washing and draining, the hide was passed through a hair removing machine as in Example 1 and the resultant hide was of the same quality as that obtained in Example 1.

EXAMPLE 4

An immobilized enzyme was prepared using two parts by weight of enzyme (Rapidepilase No. 7-RTM-Rapidase) and two parts by weight of baked and finely ground clay (passed through a 200 mesh sieve) in suspension in 100 parts of water. The resultant mixture was agitated for 12 hours at 20° C., filtered and washed three times with 25 parts by weight of a solution containing 300 g./l. of sodium chloride. 8% by weight with respect to hides of the filtered residue was then introduced into a tumbler. The depilation process was carried on for 15 hours under the conditions set forth in Example 2 and the hide thus obtained was of the same quality as that obtained in Example 1.

EXAMPLE 5

Three immobilized enzyme compositions were prepared using 1 part by weight of enzyme (Rapidepilase No. 7) and respectively, 5 parts by weight of kieselguhr for the first, 1 part by weight of bentonite (Rylor type C) for the second, and 2 parts by weight of clay (Zeolex

TABLE 1

| | Depilation with lime-sulfide | Process of the invention enzyme-carrier | Process of the invention enzyme-carrier | Depilation with free enzyme |
|---|---|---|---|---|
| Condition of the grain side: | | | | |
| Hair follicles | Clean | Very clean | Very clean | Not very clean. |
| Surface | Level | Rounded | Rounded | Very rounded. |
| Hand | Supple | A little firm | A little firm | A little firm. |
| Softness | Good | Good | Good | Good. |
| Adherence in the flanks | Weak | do | do | Average. |
| Adherence of the grain side | Poor in the flanks | Very good everywhere | Very good everywhere | Poor in the flanks. |
| Tensile strength in kg./mm.² | 1.4 | 1.5 | 1.5 | 1.5. |
| Rupture elongation in percent | 59 | 65 | 62 | 66. |
| Ball-height in mm | 7.2 | 7.4 | 7.5 | 7.5 |

Figure 2:
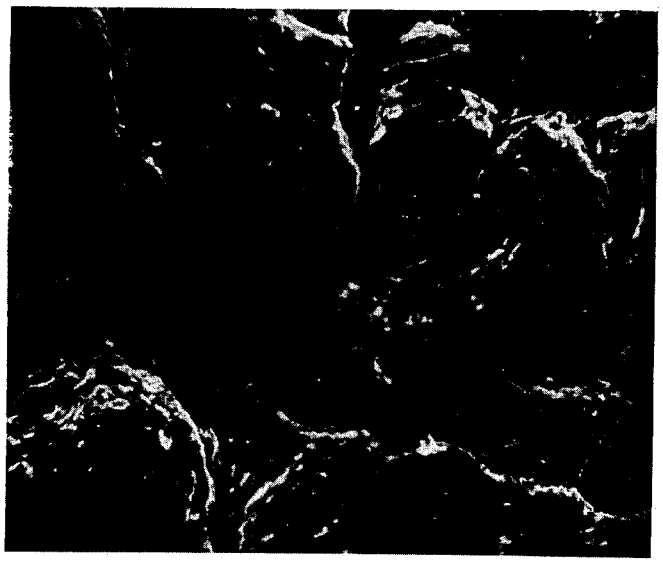
FIGS. 2 and 3 are photomicrographs of animal hides treated, respectively, with free enzymes and a bath containing lime and sodium sulfide in accordance with prior art processes.
Figure 3:
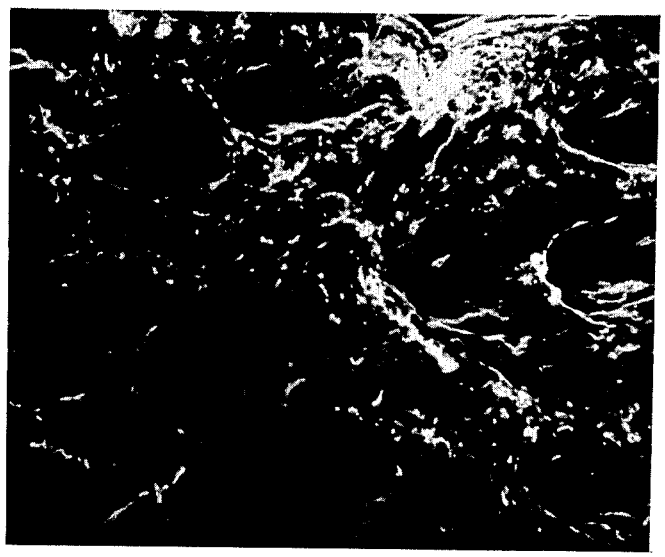

The Ball-height test conducted on a Lastometer was employed to determine the ability of the leather to undergo folding under tension. The photomicrographs in FIGS. 1, 2 and 3 were obtained with a sweeping electron microscope (magnification 100×) and illustrate the condition of the grain side following each of the above described depilating processes and tanning. It is apparent referring to FIG. 1 that hides obtained utilizing the immobilized enzyme process of the present invention are characterized by an undamaged epidermis and well defined hair follicles which are free of obstruction. Contrariwise, it is apparent that the hide depicted in FIG. 2 depilated with the use of free enzymes is practically devoid of epidermis and has hair follicles which are almost completely collapsed. Likewise as shown in FIG. 3, the epidermis of hides treated with lime and sodium sulfide is obviously seriously degraded.

EXAMPLE 2

The depilation process of the present invention was carried out as in Example 1 on the two right halves of the split hides except that the solid residue of immobilized enzyme was merely washed and centrifuged without being vacuum-dried at 20° C. The results were the same as in Example 1.

EXAMPLE 3

The two right halves of a split hide were prepared in accordance with the procedure described in Example 1. After cleaning, the hides were drained and introduced into a tumbler with 1% by weight of free enzyme (Rapidepilase No. 7-RTM-Rapidase) with respect to hide and 10% by weight of water. After rotation in the tumbler for about 3 minutes, 5% by weight with respect to hide of baked ground clay containing 500 p.p.m. of chlorine after treatment with sulfuryl chloride was introduced. After continuous rotation for 5 minutes, the tumbler was agitated for 5 hours discontinuously at a temperature of type) for the third. The carrier or support material was introduced into an enzyme solution and immobilized enzyme recovered by filtration. The immobilized enzyme preparations were used in a quantity of 1 part by weight of enzyme to 100 parts by weight of split hides dipped in 10 parts by weight of water. After 12 hours of treatment, the hair was easily removed and the hides evidenced the quality of those obtained according to the process described in Example 1.

EXAMPLE 6

A mixture of 30 parts by weight of acrylic acid and 70 parts by weignt of acrylamide were polymerized according to conventional methods in the presence of a persulfate-sodium bisulfite redox system. Following polymerization, the polymer was cross-linked with 0.5 mole of formaldehyde per mole of acrylamide while maintaining the pH at 2 for 8 hours and at room temperature. The resultant precipitate was filtered off, dried finely ground and allowed to swell in water for 24 hours at 20° C. Enzyme (Rapidepilase No. 7) was then added in a quantity of 30 parts by weight for each part of dry polymer. After 24 hours, the precipitate resulting from the reaction of enzyme and polymer carrier was washed three times with five times its weignt of sodium chloride solution to remove non-adhering enzymes.

Depilation of split hides was accomplished using 1 part by weight determined in a dry state of the enzyme preparation with respect to hides dipped in 10% of their weight of water. The hides thus treated were similar in quality to those obtained in Example 1.

EXAMPLE 7

In the past it has been necessary to use large quantities of water during the treatment of sheep pelts to remove the hair therefrom because it was difficult to prepare enzymes which had the capacity to react the wool root which is denser than the hair. To illustrate the effectiveness of the present process, 100 parts by weight of sheep pets which had been soaked for 48 hours were dipped in 30 parts of water and treated with 6 parts by weight of a composition obtained by reacting 5 parts of chlorinated baked clay and 2 parts of enzyme (Rapidepilase No. 7) as previously described in Example 2. The sheep skin thus treated was of a quality comparable to that obtained using bovine skins treated in like manner.

EXAMPLE 8

Goat skins were treated under the conditions of Example 7 except that it was necessary to employ only 10 parts by weight of water for 100 parts of skin. Again, the skins obtained were of high quality as in the previous examples.

While the invention has been described and pointed out with reference to certain preferred embodiments thereof, those skilled in the art will appreciate that various changes and modifications and substitutions can be made without departing from the spirit of the invention. It is intended, therefore, that the invention be limited only by the scope of the claims which follow.

What is claimed is:

1. A process of enzymatically depilating animal hide which comprises contacting said hide in a treatment vessel in the presence of water with at least one enzyme capable of removing hair from said hide wherein said enzyme is covalently bonded to and immobilized on a water insoluble carrier and recovering the depilated hide.

2. The process as defined by claim 1, wherein said insoluble carrier is selected from the group consisting of natural and synthetic polymers, porous glass spheres, quartz, carbon and clay particles.

3. The process as defined by claim 1, wherein said enzyme is immobilized on said carrier by both physical absorption and covalent bonding.

4. The process as defined by claim 1, wherein said enzyme is immobilized on said carrier by cross-linking said enzyme to a polyfunctional polymer carrier.

5. The process as defined by claim 1, wherein said enzyme is immobilized by physical absorption and covalent bonding to a clay carrier modified by treatment with a compound selected from the group consisting of cyanuric, cyanogen, sulfuryl and thionyl halides.

6. The process as defined by claim 1, wherein the enzyme is introduced into said treatment vessel and distributed on the surface of said hide prior to the addition of and covalently bonding with the insoluble carrier.

7. The process as defined by claim 1 wherein said enzyme is a hydrolase enzyme.

8. The process as defined by claim 7 wherein said enzyme is a protease enzyme.

9. The process as defined by claim 1 wherein said enzyme and said carrier are in the form of a powder or gel.

10. The process as defined by claim 2 wherein said polymers are water insoluble polymers selected from the group consisting of methacrylic acid-acrylamide copolymers, ethylene-maleic anhydride copolymers and methacrylic acid-methacrylic acid-3-fluoro-4,6-dinitroaniline copolymers.

11. The process as defined by claim 1 wherein the ratio, by weight, of said enzyme to said carrier varies from 0.1 to 0.5.

12. The process as defined by claim 1 wherein the amount of water present during the depilation varies from 0.5 to 100% by weight, based on the weight of said hide.

13. The process as defined by claim 1 wherein said contacting step is conducted for a period of time of from 3 to 24 hours at a temperature of from 0 to 50° C. and at a pH of from 6 to 12.

14. The process as defined by claim 1 wherein the amount of enzyme present during said contacting step varies from 0.5 to 1.5 parts by weight per 100 parts by weight of said hide.

References Cited

UNITED STATES PATENTS

| | | | |
|---|---|---|---|
| 2,857,316 | 10/1958 | Grimm | 195—6 |
| 1,974,889 | 9/1934 | Biedermann | 195—6 |
| 3,619,371 | 11/1971 | Crook et al. | 195—Dig. 11 |
| 3,647,630 | 3/1972 | Franks | 195—Dig. 11 |

ALVIN E. TANENHOLTZ, Primary Examiner

U.S. Cl. X.R.

195—63, Dig. 11